United States Patent [19]

Jones

[11] Patent Number: 5,215,835
[45] Date of Patent: Jun. 1, 1993

[54] METAL OXIDE-HYDROGEN BATTERY HAVING AN OUTER SAFETY SHELL

[75] Inventor: Kenneth R. Jones, Oconomowoc, Wis.

[73] Assignee: Globe-Union Inc., Milwaukee, Wis.

[21] Appl. No.: 758,903

[22] Filed: Sep. 11, 1991

[51] Int. Cl.$^5$ .............................................. H01M 2/06
[52] U.S. Cl. ...................................... 429/101; 429/164;
429/163; 429/90; 429/85; 429/55; 429/54; 429/53
[58] Field of Search ................. 429/101, 163, 164, 90, 429/85, 53, 54, 55

[56] References Cited

U.S. PATENT DOCUMENTS

| | | | |
|---|---|---|---|
| 4,602,250 | 7/1986 | Peace | 429/163 |
| 4,683,178 | 7/1987 | Stadnuk et al. | 429/101 |
| 4,820,597 | 4/1989 | Lim et al. | 429/101 |
| 4,923,769 | 5/1990 | Jones et al. | 429/101 |
| 4,957,830 | 9/1990 | Jones | 429/101 |

Primary Examiner—Olik Chaudhuri
Assistant Examiner—M. Nuzzolillo
Attorney, Agent, or Firm—Andrus, Sceales, Starke & Sawall

[57] ABSTRACT

A metal oxide-hydrogen battery having an outer safety shell. The battery to be used in a confined area such as in an aircraft or manned spacecraft, and includes a pressure vessel that contains at least one cell module. Hydrogen gas under pressure is confined within the pressure vessel and is impregnated in the cell modules. An outer shell, preferably formed of molded plastic, is disposed around the pressure vessel and a vent conduit connects the space between the vessel and the shell with the exterior. Any hydrogen that accidentally leaks from the vessel is captured in the space and vented to the exterior.

16 Claims, 1 Drawing Sheet

METAL OXIDE-HYDROGEN BATTERY HAVING AN OUTER SAFETY SHELL

BACKGROUND OF THE INVENTION

Metal oxide-hydrogen batteries, such as nickel oxide-hydrogen batteries, have seen wide use in aerospace applications because they are rechargeable, have an extremely long cycle life and provide a uniform output during the entire discharge cycle.

In the typical nickel oxide-hydrogen battery the positive electrodes are generally in the form of flat porous, sintered nickel plaques impregnated with nickel hydroxide, while the negative electrodes are formed of a fine nickel mesh screen having a catalyst, such as platinum black, bonded to one surface of the screen through a hydrophobic polymeric material. On discharge of the battery, hydrogen gas diffuses through the electrolyte surrounding the catalyst surfaces of the negative plates and becomes dissociated by the catalyst to the monatomic form. The monatomic hydrogen is ionized and combined with hydroxyl ions to form water with an electron being released in the process of forming each hydrogen ion. In addition, hydroxyl ions are formed at the positive electrode by the reaction of water with the available oxygen content of the nickel oxide. As a result of these reactions an electron current is produced in the exterior current.

On recharging the reaction is reversed, with the recharging being characterized by the regeneration of hydrogen gas at the negative electrode and the reoxidation of the nickel hydroxide at the positive electrode.

Due to the substantial gas pressures that are involved, the nickel oxide-hydrogen battery is contained within an outer pressure vessel. If the battery is used in a confined area or zone, such as in an aircraft or manned spacecraft, there is a potential danger in the event the hydrogen gas should leak from the outer vessel. Any leakage of hydrogen can result in explosive build up of hydrogen gas in the confined area when combined with oxygen in the air and an ignition source.

SUMMARY OF THE INVENTION

The invention is directed to a metal oxide-hydrogen battery to be used in a confined area, such as in an aircraft or a manned spacecraft, and having an outer safety shell to prevent any possible leakage of hydrogen gas into the confined area.

In accordance with the invention the battery includes a sealed pressure vessel that contains at least one cell module and hydrogen gas under pressure is contained within the vessel and is impregnated in the cell module.

An outer gas-impermeable shell, preferably formed of molded plastic, is disposed around the vessel, and a vent conduit connects the space between the vessel and the outer shell with the exterior. Any hydrogen gas that may accidentally leak from the vessel is captured in the space between the vessel and the shell and is vented to the exterior to prevent a possible explosive build up of hydrogen gas in the confined area of the aircraft or spacecraft.

As a feature of the invention, a hydrogen gas sensor can be located in communication with the space between the vessel and the outer shell and provides an indication as to the presence of hydrogen gas in the space. The hydrogen sensor can be operably connected to an audio or visual alarm. Actuation of the alarm not only indicates leakage of hydrogen from the pressure vessel, but also provides an indication that the capacity of the metal oxide hydrogen battery has been reduced due to the escape of the hydrogen gas.

The invention provides a safety mechanism which will vent to the exterior any hydrogen gas which may leak from the metal oxide-hydrogen battery and thus prevents the explosive build up of hydrogen gas in the confined area or zone.

The safety shell is light in weight and compact and will not appreciably increase the overall size or weight of the battery.

The outer shell can be formed of inexpensive molded thermoplastic material and as any hydrogen gas which may accumulate in the space between the shell and the vessel is immediately vented to the exterior, the shell can be designed to withstand minimal pressure.

Other objects and advantages will appear in the course of the following description.

DESCRIPTION OF THE DRAWINGS

The drawings illustrate the best mode presently contemplative carrying out the invention.

In the drawings.

DESCRIPTION OF THE ILLUSTRATED EMBODIMENT

The drawings illustrate a metal oxide-hydrogen battery, such as a nickel oxide-hydrogen battery, which has particular application for use in a confined area or zone such as an aircraft or a manned spacecraft. Battery 1 includes an outer pressure vessel 2 which can be constructed as described in U.S. Pat. No. 4,923,769. In general, vessel 2 includes a cylindrical metal shell formed of an alloy such as Inconel, the ends of which are enclosed by dome shaped metal heads and a layer of fiber reinforced resin can be wound around the metal shell and heads to resist the internal pressure generated by the hydrogen contained within the vessel.

Located in stacked relation within pressure vessel 2 is a group of cell modules 3 that can be constructed as disclosed in the U.S. Pat. No. 4,923,769. As disclosed in that patent application, each cell module is composed of a pair of back-to-back positive electrodes spaced apart by a separator layer along with a pair of negative electrodes, each disposed adjacent and separated from a positive electrode. The positive electrodes can be in the form of flat porous sintered metal plaques impregnated with nickel hydroxide while the negative electrodes can be in the form of fine mesh nickel screen having a catalyst, such as platinum black, bonded to one surface of the screen through a hydrophobic polymeric material. An electrolyte, such as potassium hydroxide solution, is impregnated into the fibrous separator layers that separate the electrodes.

Pressure vessel 2 contains hydrogen gas under substantial pressure. On discharge of the battery, the hydrogen gas diffuses through the electrolyte surrounding the catalyst surfaces of the negative plates and becomes disassociated by the catalyst to the monatomic form. The mono-atomic hydrogen is ionized and combines with hydroxyl ions to form water with an electron being released in the process of forming each hydrogen ion. In addition, hydroxyl ions are formed at the positive electrode by the reaction of water with the available oxygen content of the nickel oxide. As a result of these reactions, an electron current is produced in an exterior circuit.

On recharging the reaction is reversed, with the recharging being characterized by the regeneration of hydrogen gas at the negative electrode and the reoxidation of the nickel hydroxide at the positive electrode.

Figure 1:
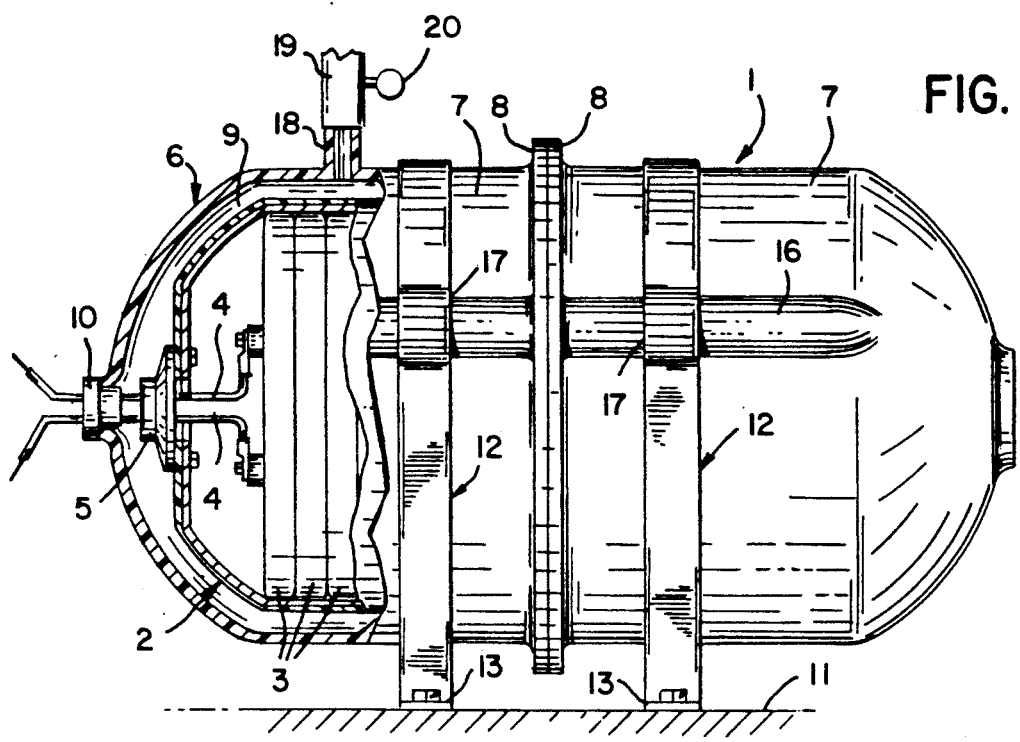
FIG. 1 is a side elevation of a metal oxide-hydrogen battery including an outer safety shell with parts broken away in section.

The positive and negative terminals of the cell modules 3 can be connected together either in series or parallel relation to obtain the desired voltage output. As shown in FIG. 1 the electrical leads 4 which are connected to the terminals of the cell modules extend in sealed relation through a fitting 5 in the dome shaped end of vessel 2. The fitting 5 can be constructed in the manner described in U.S. Pat. No. 4,923,769.

In accordance with the invention, an outer shell 6 which is impervious to the flow of hydrogen gas is located around pressure vessel 2. Shell 6 is preferably composed of a molded thermoplastic resin, such as polypropylene, and is composed of a pair of halves or sections 7 having mating flanges 8 which are joined together, preferably by heat sealing, to provide a sealed outer shell.

Shell 6 is not sealed or bonded to vessel 2 and can either be spaced a slight distance outwardly of the vessel or can be in a bearing contact with the vessel. For clarity, FIG. 1 shows the shell 6 spaced outwardly of the vessel. In either case, the space or clearance 9 between shell 6 and vessel 2 provides a passage or chamber within which any hydrogen gas that may leak from vessel 2 can be collected.

As illustrated in FIG. 1 the electrical leads 4 which are connected to the cell modules extend through an opening in shell 6 and are sealed within the opening by a seal 10.

Pressure vessel 2 and outer shell 6 are adapted to be clamped to wall 11 or other supporting structure which encloses a confined area or zone by a pair of clamps 12. The confined zone can be located in a commercial aircraft or in a manned spacecraft, and as the confined zone is normally sealed to the atmosphere it is important that any hydrogen gas leaking from pressure vessel 1 not be discharged into the confined zone for it could create an explosive gaseous mixture.

Each clamp 12 is generally U-shaped and includes a pair of feet 13 which are secured to wall 10 by fasteners, such as bolts 14.

Figure 2:
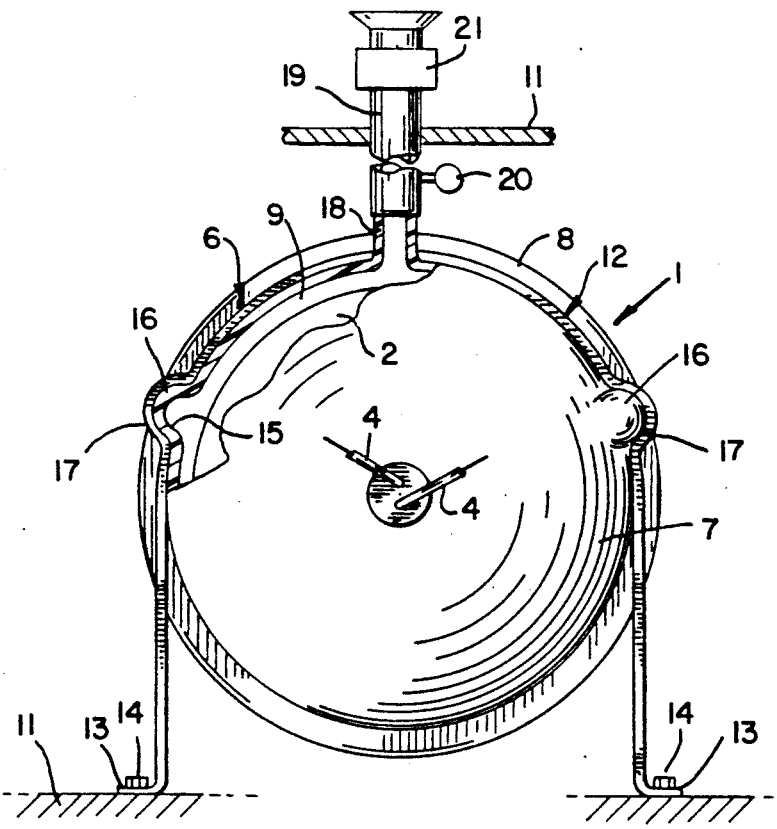
FIG. 2 is an end view of the battery.

As the molded plastic shell 6 is relatively flexible, the pressure exerted by clamps 11 may deform the shell inwardly against the vessel and close off the clearance 9, thus restricting gas flow from one end of the clearance to the other. To overcome this problem, shell 6 is provided with a pair of internal grooves 15 defined by outwardly extending ribs 16. The ribs 16 mate with grooves 17 in clamps 12, as best illustrated in FIG. 2. The grooves 15 permit free gas flow from one end of the clearance to the other.

To vent any hydrogen gas that may collect in the space 9 between the shell 6 and vessel 1, the upper end of shell 6 is provided with a tubular nipple 18 and one end of a vent tube 19 is secured to nipple 17 while the opposite end of the vent tube 18 extends in sealed relation through wall 11 to the exterior of the confined space. Any hydrogen gas which may leak from pressure vessel 1 is collected in the space 9 and will be freely vented through tube 19 to the exterior, thus preventing any potentially explosive build up of hydrogen in the confined area.

A hydrogen sensing mechanism 20 can be connected in vent tube 19 and will sense the presence of hydrogen gas. Sensor 20 can be connected to a visual or audio alarm, such as a gauge, light or horn, which will provide a signal in the event hydrogen gas is sensed in the vent tube 19. The signal provides an indication of a possible leak in the pressure vessel which in turn is an indication of a reduction in capacity of the battery.

A microporous flame arrestor 21, preferably formed of a ceramic or plastic material, can be located in conduit 19 outwardly of wall 11. The flame arrestor will absorb the heat of combustion of any flame generated at the outlet of the conduit and will prevent the propagation of the flame back to the battery.

The invention will automatically vent any leakage of hydrogen gas from the pressure vessel of the battery to the exterior to thereby prevent any explosive build up of hydrogen in the confined area or space of the aircraft or spacecraft.

The shell is preferably composed of molded thermoplastic material and as such is light in weight and inexpensive. As the shell can be clamped in close relation to the outer surface of the pressure vessel, the addition of the shell does not appreciably increase the overall size of the battery.

Various modes of carrying out the present invention are contemplated as being within the scope of the following claims particularly pointing out and distinctly claiming the subject matter which is regarded as the invention.

I claim:

1. A metal oxide hydrogen battery assembly, comprising a metal oxide hydrogen battery having an outer pressure vessel and having at least one cell module contained within the pressure vessel, said pressure vessel containing pressurized hydrogen gas, said cell module having a positive and a negative terminal, an outer gas-impermeable shell disposed around the pressure vessel to provide a space therebetween, electrical connecting means connected to said terminals and extending through said pressure vessel and extending to the exterior of said shell, and vent conduit means communicating with said space for venting any hydrogen gas leaking from said pressure vessel from said space to the exterior.

2. The assembly of claim 1, wherein said shell is composed of plastic material.

3. The assembly of claim 2, wherein said shell is composed of a pair of sections with each section having an outwardly extending flange, the flanges of said sections being disposed in mating relation and heat sealed together.

4. The assembly of claim 2, and including hydrogen sensing means communicating with said space for sensing the presence of hydrogen in said space.

5. The assembly of claim 4, and including alarm means operably connected to said hydrogen sensing means for creating a signal in response to the presence of hydrogen gas in said space.

6. The assembly of claim 1, and including clamping means for clamping the shell to a supporting structure.

7. The assembly of claim 6, wherein said clamping means extends transversely of the axis of the pressure vessel and said shell is provided with a longitudinal outwardly extending rib that defines a longitudinal internal passage, said passage providing for flow of gas from one side of said clamping means to the other side of said clamping means.

8. The assembly of claim 1, wherein said shell has an upper surface and said vent conduit means is disposed in said upper surface.

9. In combination, an enclosed zone defined by a wall, a metal oxide hydrogen battery disposed in said zone and having an outer sealed pressure vessel and having at least one cell module contained in the pressure vessel, said pressure vessel also containing hydrogen gas, an outer sealed shell disposed around the pressure vessel to provide a space therebetween, and vent conduit means having a first end communicating with said space and having a second end extending through said wall and communicating with the exterior of said zone, said vent conduit means serving to vent any hydrogen gas leaking from said pressure vessel from said space to the exterior.

10. In combination, an enclosed zone bordered by a wall, a metal oxide-hydrogen battery disposed in said zone and having an outer sealed pressure vessel and having at least one cell module contained in said pressure vessel, said pressure vessel also containing hydrogen gas, said cell module having a positive and a negative terminal, a sealed outer shell disposed around the pressure vessel to provide a space therebetween, electrical connecting means connected to the terminals of said cell module and extending in sealed relation through said pressure vessel and through said shell to the exterior of said shell, vent conduit means having a first end communicating with said space and having a second end communicating with the exterior of said zone for venting any hydrogen that leaks from said pressure vessel into said space, and clamping means for clamping said shell to said wall.

11. The assembly of claim 10, wherein said clamping means extends transversely of the axis of the pressure vessel and said shell is provided with a longitudinal outwardly extending rib that defines a longitudinal passage, said passage permitting gas flow within said space from one side of said clamping means to the opposite side of said clamping means.

12. The combination of claim 10, wherein said shell is composed of rigid thermoplastic material.

13. The combination of claim 12, wherein said shell is composed of a pair of sections, each section having an outwardly extending circumferential flange, said flanges being disposed in mating relation, and heat seal means joining said flanges together.

14. The combination of claim 10, and including hydrogen sensing means communicating with said space for sensing the presence of hydrogen gas in said space, and signaling means operably connected to said hydrogen sensing means for generating a signal in response to the presence of hydrogen gas.

15. The combination of claim 10, and including flame arrestor means disposed in said vent conduit means for preventing the propagation of a flame back through said vent conduit means to said space.

16. The combination of claim 15, wherein said flame arrestor means is located outside of said enclosed zone.

* * * * *